United States Patent
Rich et al.

(10) Patent No.: US 7,093,561 B2
(45) Date of Patent: Aug. 22, 2006

(54) CONVERTIBLE FEED PORT ASSEMBLY FOR BIRD FEEDERS

(75) Inventors: Christopher T. Rich, Leola, PA (US); Edward Jeffrey Holliday, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 30 days.

(21) Appl. No.: 10/894,342

(22) Filed: Jul. 20, 2004

(65) Prior Publication Data

US 2006/0016400 A1    Jan. 26, 2006

(51) Int. Cl.
    *A01K 61/02* (2006.01)
(52) U.S. Cl. .................................................. 119/57.8
(58) Field of Classification Search .............. 119/57.8, 119/52.2, 52.4, 53; D30/124
    See application file for complete search history.

(56) References Cited

U.S. PATENT DOCUMENTS

| 5,033,411 | A | * | 7/1991 | Brucker | 119/52.2 |
| 5,215,039 | A | * | 6/1993 | Bescherer | 119/57.8 |
| 5,404,838 | A | * | 4/1995 | Khan | 119/57.8 |
| 6,062,167 | A | * | 5/2000 | Soley | 119/57.8 |
| 6,408,788 | B1 | | 6/2002 | Lieb et al. | |
| 6,546,894 | B1 | | 4/2003 | Chrisco et al. | |
| 6,863,024 | B1 | * | 3/2005 | Obenshain | 119/57.8 |
| 2004/0231606 | A1 | * | 11/2004 | Nock | 119/57.8 |

* cited by examiner

*Primary Examiner*—Robert P. Swiatek
*Assistant Examiner*—Elizabeth Shaw
(74) *Attorney, Agent, or Firm*—Jacobson Holman PLLC

(57) ABSTRACT

A bird feeder has a containment housing and a convertible feed port assembly mounted through a housing opening. The feed port assembly includes a feed port having a port plate and a support frame which extends into the housing through the port opening. The port plate defines a port opening aligned with the housing opening to enable access to the bird feed within the housing. The feed port assembly also includes a door slidably and rotatably mounted in the feed port. In a retracted position, the door is supported by the support frame in the housing and leaves the port open to provide access to seed within the interior of the housing. The retracted door cooperates with the support frame to form a roof or baffle to prevent seeds from falling out of the port opening. The door is slidable outwardly from the housing interior and rotatable to overlie and close off the door opening. The door has a relatively small aperture for access to small bird seed when the door is closed.

20 Claims, 6 Drawing Sheets

CONVERTIBLE FEED PORT ASSEMBLY FOR BIRD FEEDERS

BACKGROUND OF THE INVENTION

1. Field of the Invention

This invention generally relates to a convertible feed port assembly for mounting to a bird feeder housing. The feed port assembly includes a port opening therethrough, and a door rotatably mounted above the port opening and slidable horizontally to be supported within the housing, thus enabling large size bird feed to be accessible through the port opening. The slidably and rotatably mounted door includes a relatively small aperture for access to smaller size bird feed that can be stored within the housing, such as thistle, accessible by finches. Thus, the bird feeder can be operable in both a large seed and separate small seed or thistle mode by the relative positioning of the door.

2. Description of the Related Art

Commercially available bird feeders come in a great variety of configurations. These feeders generally include a housing for retaining the bird feed with a plurality of openings in the housing wall to provide access to the bird feed within the housing interior. Such bird feeders include bird feeder port assemblies that are mounted within the housing openings for access to bird feed within the housing. Such port assemblies may include a perch to enable a bird to have access to bird feed within the housing.

Bird feeders having bi-modal seed ports, whereby the seed port can be converted for dispensing large seeds from the feeder and, in another mode, allowing the feeder to dispense relatively small seeds, are known in the art. In U.S. Pat. No. 6,408,788, a bi-modal seed port for a bird feeder is disclosed wherein the seed port is connected to the housing wall and includes a hinged lid that pivots adjacent a trough located on the anterior surface of the housing. The trough is suitable for receiving relatively large seed. The hinged lid is pivotable to a position where the trough is open and bird feed within the housing flows into the trough. The hinged lid can pivot to a second position where the trough is covered and access to the seed is through a smaller aperture in the lid. However, when the lid is in this second position, the bird's access to the aperture is limited because the aperture may be partially blocked by the trough which is adjacent to the aperture. Because of the trough, the bi-modal design is compromised for smaller feed, such as thistle. Accordingly, a need exists for an effective convertible feed port assembly that is equally well-suited in a first mode for large birds and a second mode for smaller birds, such as finches.

SUMMARY OF THE INVENTION

In order to overcome the deficiencies of the prior art, the bird feeder of the present invention includes a convertible feed port assembly, including a feed port having a port plate with a port opening therethrough that is aligned with a housing opening to enable access to bird feed within the housing in each mode. A door having a feed aperture therethrough is movable from a closed position wherein the bird feed within the housing is accessible only through the feed aperture within the door, enabling access to small bird feed within the housing. The door is rotatable from the closed position and slidable into a support position within the housing, thereby opening the relatively larger port opening to access larger bird feed that might be stored within the housing.

The door is supported on a support frame having generally parallel side walls, a back wall and a partial roof, all integral with the feed port plate. The support frame extends through the housing opening into the housing interior and includes a track oriented substantially perpendicular to the port plate. The door is slidable along the track between a retracted, generally horizontal, position within the housing interior to a position outside the housing where it is rotatable within the track to close off the port opening, thereby limiting access to the feed within the housing through only the relatively small feed aperture within the door.

In the preferred embodiment, the track is formed by a pair of oppositely-facing, generally horizontal, and parallel guiding tracks formed at the upper edges of the support frame sidewalls and adjacent edges of the partial roof. The door has a pair of lateral projections extending outwardly from its opposed upper corners. The projections and tracks are sized so that the projections can rotate in the front portion of the tracks, adjacent the feed port plate, and slide rearwardly in the tracks in a generally horizontal direction to a retracted, stored position. A stop prevents the door from sliding beyond its retracted, stored position.

The port opening is coplanar with the port plate and all of the bird feed is retained entirely within the housing. When the door is retracted all of the bird feed is accessible through the port opening. A perch is located below the port opening and there are no external troughs to receive bird feed external to the housing contour.

When the door is slid on the support frame track into the interior of the housing to its retracted position, with the port opening now open, the door is supported horizontally, in the track, substantially perpendicular to the port plate. The door cooperates with the partial roof to provide a baffle to prevent seed from flowing out of the port opening. Feed is further retained within the housing and prevented from exiting the port opening by the support frame side walls and back wall to form a housing or shed with the retracted door and partial roof, to prevent the seed from flowing out of the housing interior through the port opening.

It is therefore an object of the present invention to provide a bird feeder with a convertible feed port assembly to enable effective utilization of the bird feeder housing for both large size feed and small size feed, such as thistle.

It is another object of the present invention to provide an effective bird feeder assembly having a port plate and an interior support frame integral therewith that is easily converted between the large seed/small seed modes by sliding and rotating a door within the frame.

It is still another object of the present invention to provide a convertible feed port assembly where the feed port plate mounted to the housing, and including a port opening, is free of external encumbrances, such as external troughs, which inhibit smaller birds, such as finches, from accessing the small seed within the housing.

It is a further object of the present invention to provide a feed port assembly in which the door that is rotatably and slidably mounted within the support frame of the feed port cooperates with the support frame when the door is retracted to form a baffle or shed in the large feed mode to inhibit outward flow of bird seed from the housing. All of the feed remains within the housing when the door so functions as a roof in combination with support frame extending inwardly from the port plate.

Yet another object of this invention to be specifically enumerated herein is to provide a bird feeder port assembly in accordance with the preceding objects which will conform to conventional forms of manufacture, be of simple construction and easy to use so as to provide a bird feeder port assembly that will be economically feasible, strong and long lasting and relatively trouble free in installation and use.

These together with other objects and advantages which will become subsequently apparent reside in the details of construction and operation as more fully hereinafter described and claimed, reference being had to the accompanying drawings forming a part hereof, wherein like numeral refer to like parts throughout.

BRIEF DESCRIPTION OF THE DRAWINGS

The drawings serve to illustrate the present invention, but are not intended to be drawn to scale.

DESCRIPTION OF THE PREFERRED EMBODIMENTS

Figure 1:
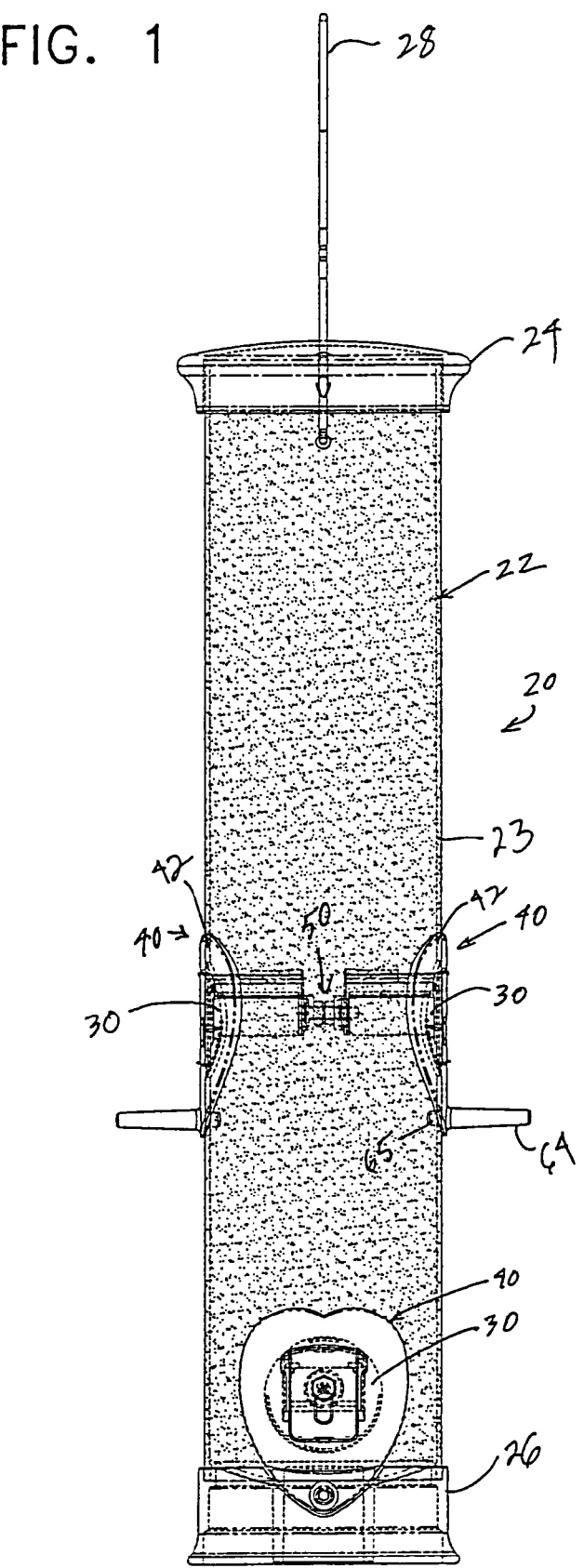
FIG. 1 is a front view of a bird feeder with two pairs of convertible bird feeder port assemblies in accordance with the present invention mounted in a back-to-back relationship.
Figure 2:
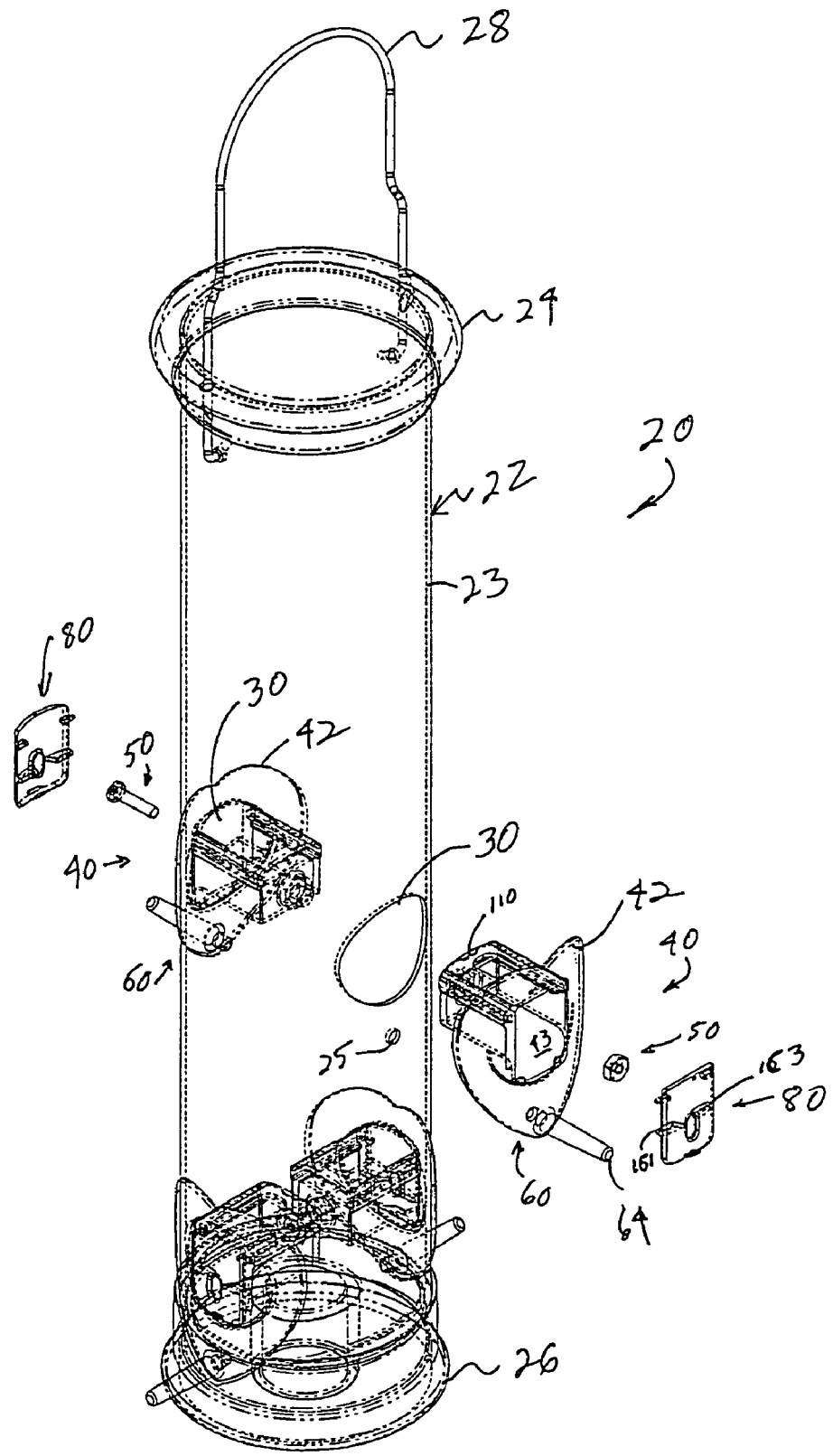
FIG. 2 is a perspective view of the bird feeder shown in FIG. 1 with one pair of the convertible feed port assemblies show in an exploded view.

Although only one preferred embodiment of the invention is explained in detail, it is to be understood that the embodiment is given by way of illustration only. It is not intended that the invention be limited in its scope to the details of constructions and arrangement of components set forth in the following description or illustrated in the drawings. Also, in describing the preferred embodiment, specific terminology will be resorted to for the sake of clarity. It is to be understood that each specific term includes all technical equivalents which operate in a similar manner to accomplish a similar purpose.

Referring now to the drawings, a preferred embodiment of a bird feeder is designated generally by reference numeral 20 and includes a main bird feed containment housing 22 of cylindrical, or tubular, shape. The housing 22 is preferably formed of translucent or transparent plastic material. The housing wall can also be mottled and of different colors as may be desired. The bird feed containment housing 22 includes top and bottom caps or covers 24, 26 which can be secured to the cylindrical housing in any convenient manner, along with a hangar through the top cap 24 for attachment to a hook or other hanging support member. Although a cylindrical housing, or hopper, 22 is depicted, the present invention has applicability to housings of other configurations.

Plural holes 30, preferably circular although other shapes may be employed, are provided in the housing wall 23. The convertible feed port assembly of the present invention, designated generally by reference numeral 40, is secured to the housing 22 and extends through the housing holes 30. Each port assembly 40 includes two components: a feed port generally designated by reference numeral 60; and a door generally designated by reference numeral 80. The feed port 60 includes a port plate 42 with a port opening 43 therethrough for alignment with the housing opening 30 to enable access to bird feed within the housing 22. The port plate 42 is contoured to conform with the contour of the housing wall 23 and includes a back wall 63 engageable with the outwardly facing surface of housing wall 23 around the opening 30. A perch 64 is integral with the port plate 42 and, as shown, preferably includes a rear post 65 that extends into an opening 25 within the wall 23 of the housing 22. The post 65 serves to keep the port assembly 40 properly aligned in opening 30, but is not essential; the perch 64 can be attached only to the feed port plate 42 with no interconnection with the housing wall 23.

In the preferred embodiment, the housing 22 includes opposed pairs of holes 30 for receiving identical convertible feed port assemblies 40 in back-to-back relationship wherein each feed port assembly 40 is screwed or bolted to its counterpart feed port assembly by suitable screws or bolts 50 with the feed port assembly plates 42 abutting the exterior of the housing wall 23. When the screw or nut/bolt arrangement 50 is tightened, tension between the port assemblies 40 is provided and they tend to move in a direction toward each other, thus clamping the plates 42 of the port assemblies 40 to the housing wall 23 in a tight, secure manner. It should be recognized that the present invention is not limited to this particular attachment mechanism and the convertible feed port assembly 40 may be affixed to the housing wall in any suitable manner.

Figure 9:
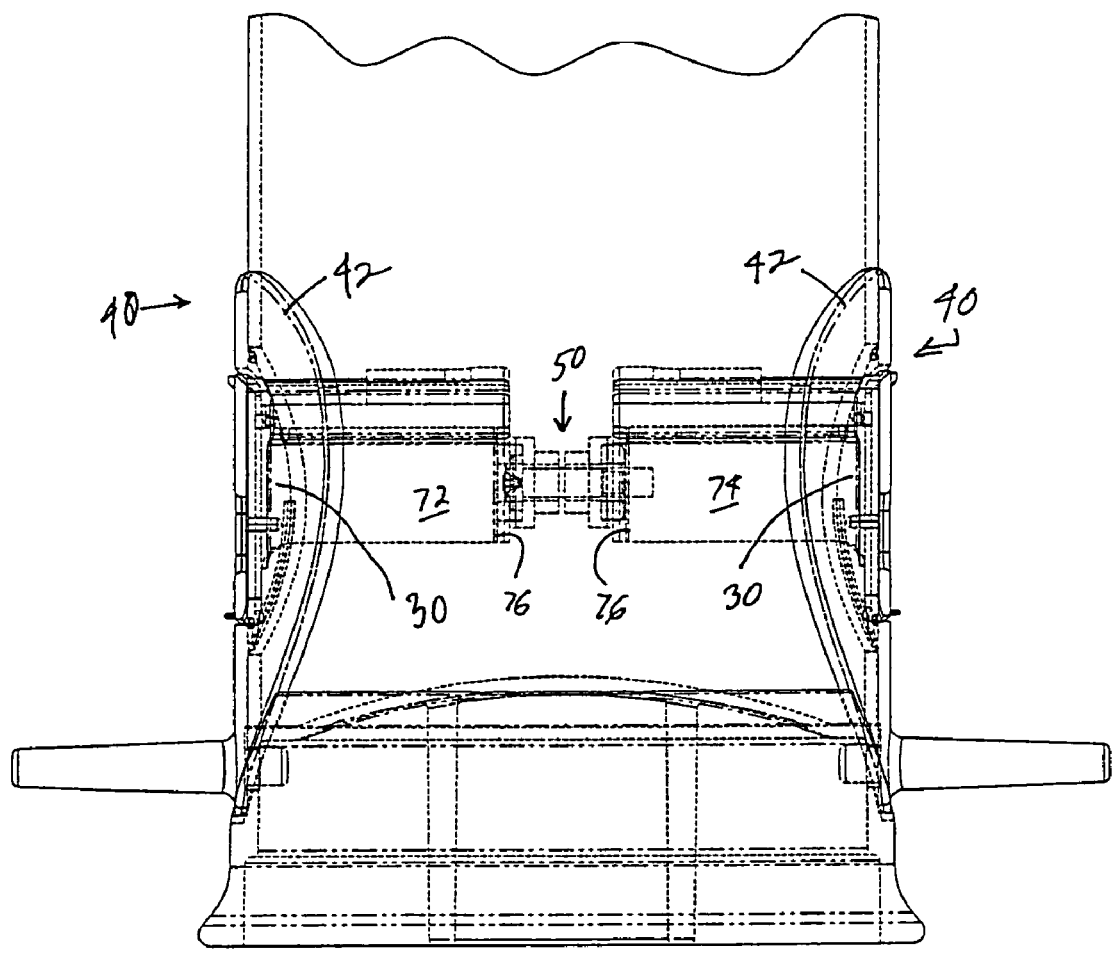
FIG. 9 is a detail of back-to-back convertible feed port assemblies of the present invention interconnected with each other to draw each of the assemblies toward each other for retention on the housing wall.

Integral with, and extending from, the interior surface 63 of the port plate 42 is a support frame, generally designated by reference numeral 70. Support frame 70 includes a pair of parallel side walls integral with the port plate 42 and extending from the side edges 90, 92 of the port opening 43 in an inward direction into the interior of the housing. The rear portion of each parallel side wall 72, 74 is connected by a back wall or base plate 76 with an opening 52 for receiving a screw or nut and bolt arrangement 50 for affixing to the complementary port assembly, as shown in FIGS. 1 and 9. Of course, if a different mounting arrangement is contemplated, for example, if the port assembly were attached to the housing wall in a different manner, then the back plate 76 may not have any screw hole opening.

Figure 3:
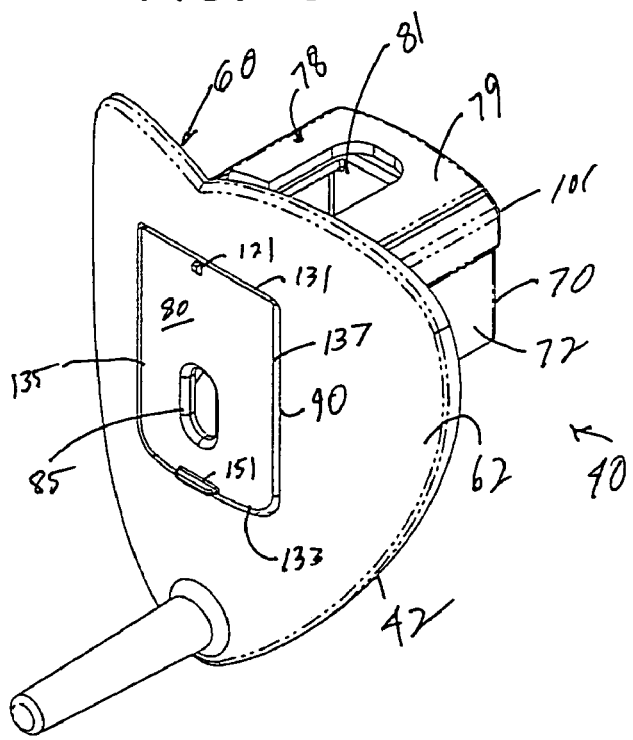
FIG. 3 is a front perspective view of the convertible feed port assembly of the present invention with the door in its closed position for enabling access to small seed within the housing interior.

The support frame 70 with its side walls 72, 74 and base plate or wall 76 is thus substantially U-shaped and also includes a partial roof 78 adjacent the rear of side walls 72, 74 terminating at edge 79 with a U-shaped cut-out 81 centrally located. The roof 78 extends approximately one-half to three-quarters the distance between the back wall 76 and the port plate rear surface 63, leaving along with cut-out 81 a relatively large open roof area 83 to enable bird feed to fall therethrough and fill the space behind the door 80, when the door is in its closed position (FIG. 3). When the door 80 is in its retracted position (FIGS. 5 and 6), as will be described, the door will close-off the roof open areas 81, 83 and act as a top baffle plate to thus form a shed defined by the side walls 72, 74 and back wall 76 along with the door 80, to inhibit bird seed from spilling out of the housing interior through the port opening. Instead, the bird seed tends to build up from underneath the side walls 72, 74 and back wall 76.

Figure 5:
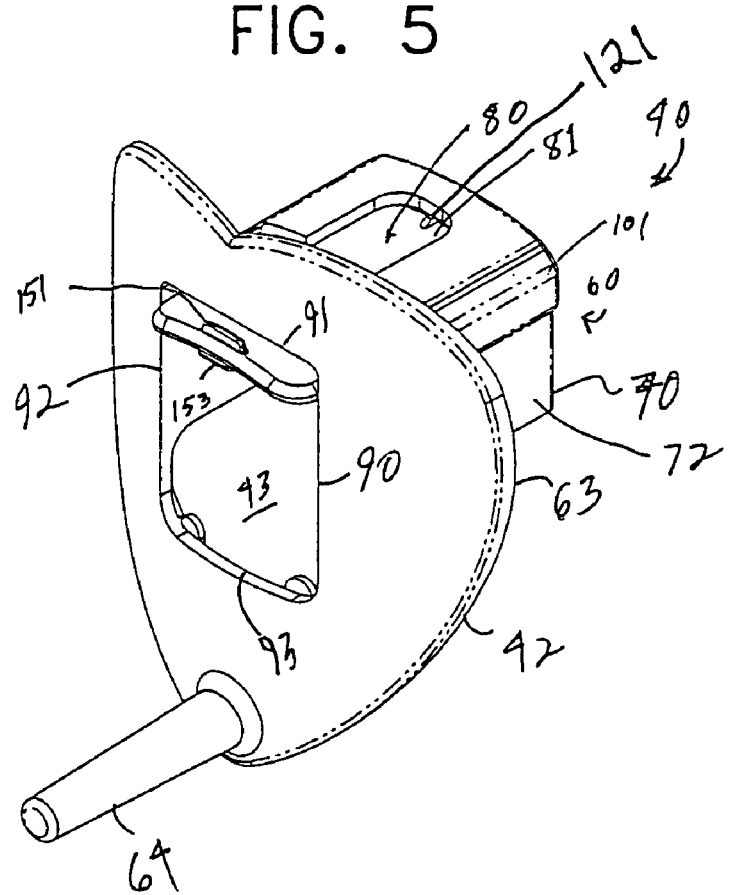
FIG. 5 is a front perspective view of the convertible feed port assembly of FIG. 3 with the door supported in a horizontal, but not quite fully retracted, position whereby the port opening is open for access to large size feed within the housing interior.
Figure 6:
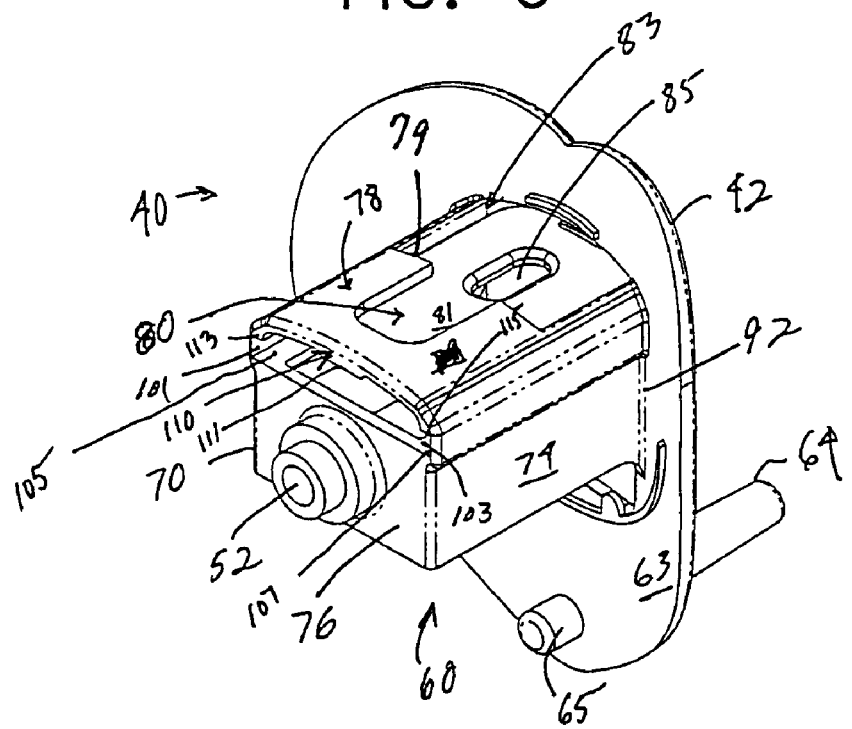
FIG. 6 is a rear perspective view of the convertible feed port assembly of FIG. 3 with the door supported in its fully retracted, horizontal position.
Figure 7:
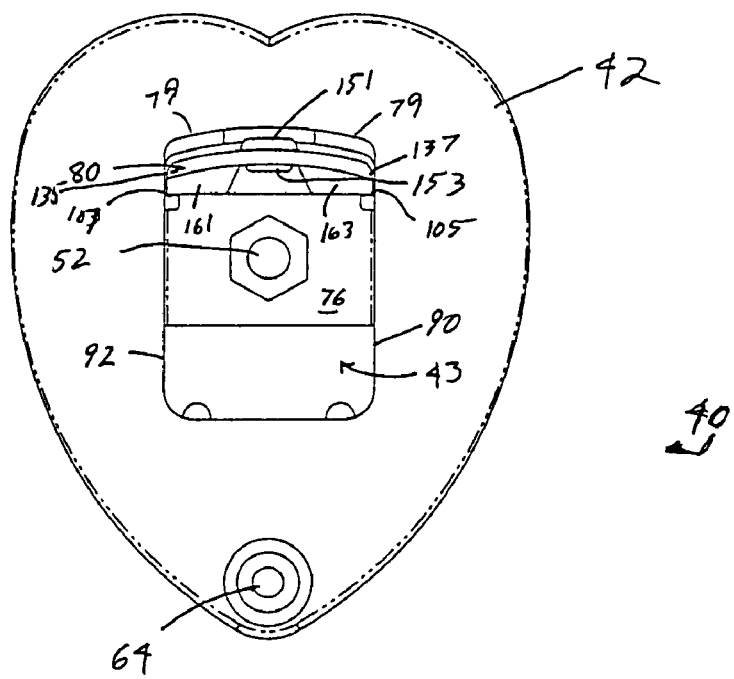
FIG. 7 is a front view of the convertible feed port assembly of FIG. 3 with the door in its fully retracted, horizontally supported position.
Figure 8:
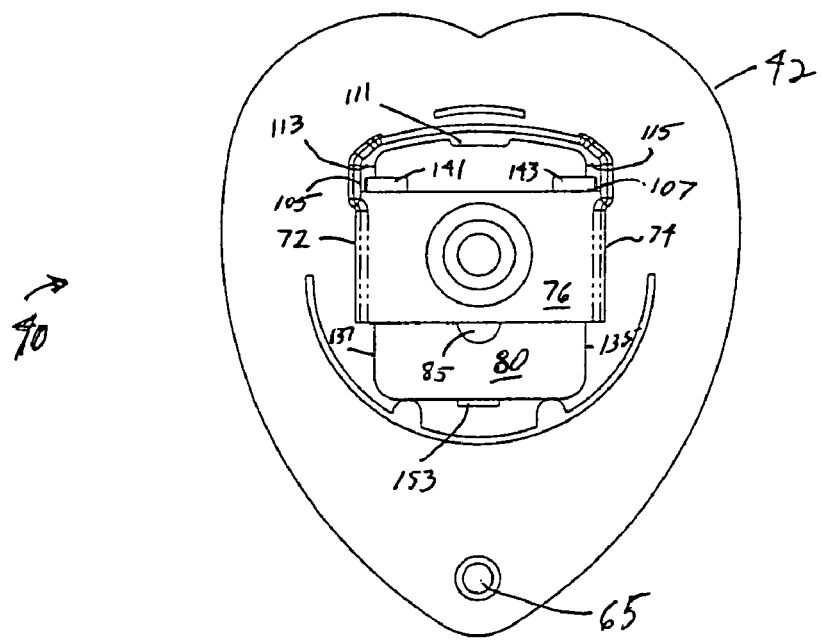
FIG. 8 is a rear view of the convertible feed port assembly of FIG. 3 with the door closed over the port opening.

At the top of each side wall 72, 74 of the support frame lies a track or groove 101, 103. The tracks extend from the port opening 43 inwardly into the housing interior and are open at the back wall 76. This opening enables the door 80 to be assembled to the port 60 through the rear of the port. The roof 78 of the support frame includes a vertical stop 110 which keeps the door 80 from inadvertently going past its retracted position. The vertical stop is defined by a lip 111 extending downwardly from the rear of the roof 78 which is engaged by a door pin 121 when the door 80 is slid into its retracted position as shown in FIGS. 5 and 6. The door pin 121 has a forward inclined surface to facilitate the pin 121 sliding underneath lip 111 when the door 80 is assembled in the tracks 101, 103 through the rear of the port 60.

The tracks 101, 103 are formed in the top of each of the side walls 72, 74 of the U-shaped support frame 70. The track 101, 103 are defined by ledges 105, 107 coplanar with the top of the back wall 76 and parallel roof edges 113, 115. The port opening 43 in the port plate 42 includes parallel top and bottom edges 91, 93, along with parallel side edges 90, 92. The tracks 101, 103 are located adjacent the top edge 91 of the port opening 43 and end at the port plate back wall 63.

The door 80 has a top edge 131, a bottom edge 133 and side edges 135, 137 and is contoured substantially identical to the contour of the port plate 42. Thus, when the door is in its closed position to cover the door opening (FIG. 3), the door 80 is flush or coplanar with the surface of the port plate 42. The door 80 includes a relatively small aperture 85 defining a small feed opening, such as an opening for thistle. The door 80 includes, from each side edge 135, 137, a slide 140 in the form of pins 141, 143 that are receivable and slidable within the tracks 101, 103 of the door support member 70. The slide 140 is slidable in the tracks 101, 103 and the pins are rotatable within the tracks (see FIG. 4) after the door top edge 131 is slid to a forward position past the partial roof edge 79 so that the top edge 131 is free to swing upwardly in roof open area 83 as the door is swung downwardly and forwardly. The door 80 is slidable in a horizontal orientation, i.e., substantially perpendicular to the port flange 63.

In its rearwardmost retracted position, the door pin 121 will abut the lip 111 to provide the stop for the rearward movement of the door. The door 80 is supported in this position and the door opening 43 is open. The door 80 in this horizontal support position forms a roof or barrier, with the side walls 72, 74 and back wall 76, to inhibit seed flow out of the housing interior. The door 80 acts as a baffle in conjunction with side walls 72, 74 and back wall 76 to form an interior shield or shed to effectively impede the flow of seed out of the housing. The small aperture 85 or thistle port will provide a small opening in its roof area, but it is sized so that larger seeds cannot fall therethrough.

Approximately mid-way along the length of the door 80, adjacent opposite sides of the small aperture 85 are a pair of generally trapezoidal-shaped secondary slide members 161, 163 that are integral with the interior face of the door 80 and extend laterally to the door edges 135, 137. These secondary slide members 161, 163 overlie the ledges 105, 107, but do not extend laterally as far as the pins 141, 143. The primary purpose for these secondary slide members is to provide support for the forward or lower end of the door when in its horizontal retracted position and serving as a seed barrier.

Figure 4:
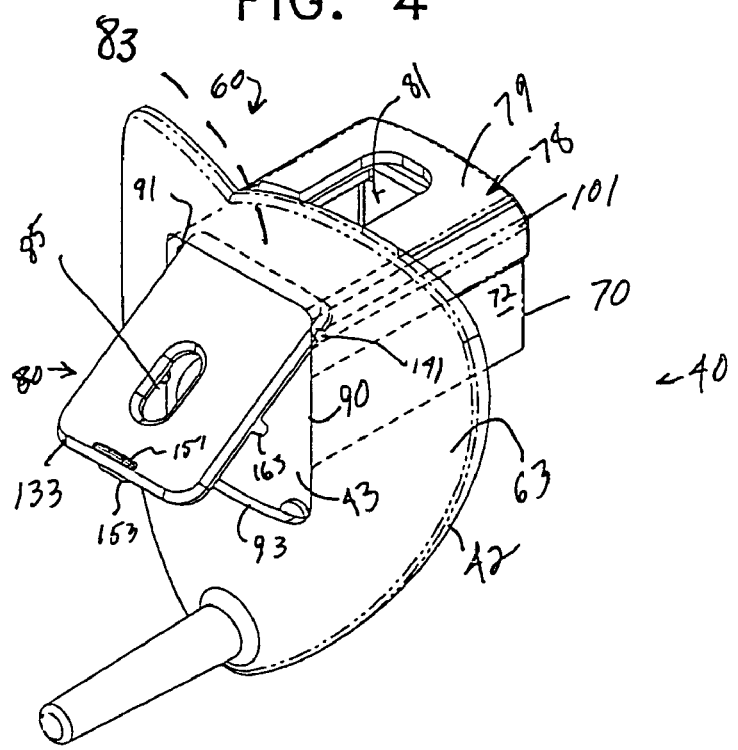
FIG. 4 is a front perspective view of the convertible feed port assembly of FIG. 3 with the door rotated to be partially opened.

The side walls 72, 74 of the U-shaped support frame 70 preferably extend about one-half to two-thirds down the length of the side edges 90, 92 of the port opening 43. This provides ample space for the bird feed to build up and enable access to the large seeds within the housing. The bottom of the door 80 includes a downwardly extending protrusion 153 on the door back wall which engages the inside wall of plate 42 behind edge 93 when door 80 closes opening 43. This engagement keeps the door 80 from opening when seeds build up against the inside of the door bottom edge 133. Protrusion 151 extends outwardly from the door bottom edge 133 for finger manipulation by the user to push the door 80 upwardly so that protrusion 151 can clear edge 93 when opening the door. When the door 80 extends outside of the housing as shown in FIG. 4, the slides, or pins 141, of the door 80 may rotate such that the door rotates downwardly to overlie and close off the door opening, thus providing access to the housing interior only through the small aperture or thistle opening 85.

The feed port 60 and door 80 are preferably formed of plastic that is relatively rigid and can be made of a contrasting color to the color of housing 22. The door 80, however, will have some minor flexibility to ease insertion (or removal) of the door 80 through the rear of the port 60 above the back wall 76. In another embodiment, both the door and the port assembly can be of metallic material, such as aluminum, and, thus, be relatively strong and rigid.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A bird feeder comprising:
a bird feed containment housing having a housing wall defining a housing interior and having at least one housing opening to receive a convertible feed port assembly;
a convertible feed port assembly including,
a feed port having a port plate with a port opening therethrough aligned with said housing opening to enable access to bird feed within the housing and engageable with the exterior of said housing wall, and a support frame connected with said port plate and extending through the housing opening into the housing interior, said support frame including a track oriented substantially transverse to said port plate for receiving and supporting a door; and
a movable door having a feed aperture therethrough, said door engaged within said track so as convert said bird feeder between an open door position in which said port opening of said port plate is opened by moving said door to a retracted position within said housing interior such that bird feed within the housing is accessible through said port opening, and a closed door position in which said port opening is closed and bird feed within the housing is accessible only through said feed aperture of said door, said door remaining engaged with said track in both said open and closed positions and while moving therebetween.

2. The bird feeder of claim 1, wherein said port plate is contoured to the housing wall and said port opening is coplanar with said port plate, whereby bird feed is retained entirely within said housing and accessible through the port opening.

3. The bird feeder of claim 2, wherein said feed port includes a perch located below said port opening.

4. The bird feeder of claim 2, wherein said feed aperture is substantially smaller than said port opening.

5. The bird feeder of claim 4, wherein said feed aperture is sized for access to thistle feed within said housing.

6. The bird feeder of claim 2, wherein said port opening has top, bottom, and opposite side edges, and said support frame is substantially U-shaped including a pair of parallel side walls interconnected by a back plate, each side wall including a track extending from said port plate to said back plate from adjacent said top edge of said port opening, and said door including a pair of slides for rotating said door on said axis, each of said slides extending from opposite side edges of said door and positioned within said track and slidable thereon such that said door, when retracted, is supported within said housing at a level adjacent the top edge of said port opening.

7. The bird feeder of claim 6, wherein said door, said side walls, and said back plate form a shed to prevent seed from flowing out of the port opening.

8. The bird feeder of claim 6, wherein said slides are rotatable within said track to orient said door to close said port opening.

9. The bird feeder of claim 6, wherein said door includes top, bottom and parallel side edges, and each of said slides includes a pin integral with said door and extending from opposite side edges.

10. The bird feeder of claim 6, further comprising a second convertible feed port assembly identical to said convertible feed port assembly and mounted within a second housing opening aligned with said housing opening, wherein the back plates of each feed port assembly are adjustably interconnected with respect to each other.

11. The bird feeder of claim 1, wherein said door, in its retracted position, provides a baffle to prevent seed from flowing out of the port opening.

12. The bird feeder of claim 1, wherein said port plate includes an inward projection received in a hole in said housing wall to maintain said feed port assembly aligned with said housing opening.

13. A bird feeder comprising:
a bird feed containment housing having a housing wall defining a housing interior and having at least two opposed housing openings;
a pair of interconnected, back-to-back, convertible feed port assemblies received and supported in said two opposed housing openings;
each of said convertible feed port assemblies including,
a feed port having a port plate with a port opening therethrough aligned with said housing opening to enable access to bird feed within the housing and engageable with an exterior surface of said housing wall, and having a support frame connected with said port plate and extending through the housing opening into the housing interior, said support frame including a track that extends generally perpendicular to said port plate; and
a door having a feed aperture therethrough and being slidable and rotatable in said track so as to move said door between a retracted position generally parallel with said track in which the port opening is open and bird feed within the housing is accessed through the port opening, and a closed position generally perpendicular to said track in which said port opening is closed and bird feed within the housing is accessible only through said door feed aperture, said door remaining engaged with said support frame in both of said positions and while moving the therebetween.

14. The bird feeder of claim 13, wherein said door includes side edges with a slide extending from each of said side edges, each slide being rotatable and slidable within a respective track that extends from the port opening into the housing interior.

15. The bird feeder of claim 13, wherein said track is defined by side walls of said support frame which extend from the port opening into the housing interior, said side walls being interconnected by a back wall.

16. The bird feeder of claim 13, wherein said port plate further includes a perch positioned below said port opening, said port plate being free of any external troughs.

17. A convertible feed port assembly for a bird feeder comprising a feed port plate having a port opening therethrough, a pair of side walls extending from the port plate adjacent said port opening and interconnected by a back wall, each of said side walls including a track generally perpendicular to said port opening, a door mounted to overlie the port opening generally coplanar with the port plate in a first position, said door including side edges with a slide extending from each of said side edges, each slide being rotatable and slidable within said track to enable said door to rotate and slide along said track to a retracted second position that is substantially perpendicular to and adjacent the top of the port opening, said door when fully retracted being supported in a substantially transverse position relative to said port plate.

18. The convertible feed port assembly of claim 17, wherein said door in said retracted position, said side walls and said back wall form a substantially enclosed shed.

19. The bird feeder of claim 17, wherein said port plate further comprises a perch positioned below said port opening, said port plate being free of any external troughs.

20. The convertible feed port assembly of claim 17, wherein said door includes a small feed aperture such that, when said door is in said first position, said port is closed and bird feed within the housing is accessible only through said feed aperture, said door in said second position opening said port opening to allow bird feed to be accessed through said port opening.

* * * * *